United States Patent
Saksonov et al.

(10) Patent No.: US 10,540,454 B2
(45) Date of Patent: Jan. 21, 2020

(54) SYSTEM MAINTAINING DOMAIN-SPECIFIC 3D MODELS AS A GRAPH WITHIN COMPUTER AIDED DESIGN

(71) Applicant: Onshape Inc., Cambridge, MA (US)

(72) Inventors: Lana Saksonov, Andover, MA (US); Scott S. Harris, Acton, MA (US); Elif Tosun, Arlington, MA (US); Paul R. Chastell, Lexington, MA (US); Emmett Weeks, Cambridge, MA (US)

(*) Notice: Subject to any disclaimer, the term of this patent is extended or adjusted under 35 U.S.C. 154(b) by 0 days.

(21) Appl. No.: 15/861,426

(22) Filed: Jan. 3, 2018

(65) Prior Publication Data
US 2018/0189419 A1 Jul. 5, 2018

Related U.S. Application Data

(60) Provisional application No. 62/442,033, filed on Jan. 4, 2017.

(51) Int. Cl.
*G06F 17/50* (2006.01)
*G06T 19/20* (2011.01)
*G06F 16/14* (2019.01)

(52) U.S. Cl.
CPC ............ *G06F 17/50* (2013.01); *G06T 19/20* (2013.01); *G06F 16/14* (2019.01); *G06F 2217/02* (2013.01); *G06F 2217/42* (2013.01)

(58) Field of Classification Search
CPC ...... G06F 17/50; G06F 16/14; G06F 2217/02; G06F 2217/42; G06T 17/10; G06T 19/20; G06T 2219/2021

USPC .......................................................... 345/420
See application file for complete search history.

(56) References Cited

U.S. PATENT DOCUMENTS

| | | | |
|---|---|---|---|
| 7,398,129 B2 | 7/2008 | Ishii et al. | |
| 7,813,901 B2 | 10/2010 | Sakai | |
| 2001/0023418 A1* | 9/2001 | Suzuki | B29C 33/3835 705/400 |
| 2003/0071810 A1* | 4/2003 | Shoov | G06F 17/50 345/420 |
| 2006/0041840 A1 | 2/2006 | Blair et al. | |
| 2006/0119601 A1* | 6/2006 | Finlayson | G06T 15/20 345/427 |
| 2006/0269343 A1* | 11/2006 | Nagao | G06F 17/50 400/62 |
| 2007/0225846 A1 | 9/2007 | Bogan et al. | |
| 2010/0013833 A1 | 1/2010 | Gandikota et al. | |
| 2012/0310604 A1 | 12/2012 | Bazilevs et al. | |
| 2013/0151551 A1 | 6/2013 | Chow et al. | |
| 2015/0278400 A1 | 10/2015 | Mattson et al. | |
| 2016/0246897 A1 | 8/2016 | Kannan et al. | |

* cited by examiner

*Primary Examiner* — Ke Xiao
*Assistant Examiner* — Kim Thanh T Tran
(74) *Attorney, Agent, or Firm* — Clocktower Law LLC; Erik J. Heels; Michael A. Bartley

(57) ABSTRACT

Multiple simultaneous representations are achieved through the capture essential geometry and topology in a master graph. Object information is captured in metadata associated with elements of this graph. An algorithm builds multiple domain specific representations based on the master graph and metadata. The summary of model objects is created based on metadata. Through this abstraction, desired representations (in this case for design and for manufacturing) may be generated and presented simultaneously with associativity.

12 Claims, 4 Drawing Sheets

SYSTEM MAINTAINING DOMAIN-SPECIFIC 3D MODELS AS A GRAPH WITHIN COMPUTER AIDED DESIGN

CROSS-REFERENCE TO RELATED APPLICATIONS

This utility patent application claims priority from U.S. provisional patent application Ser. No. 62/442,033, filed Jan. 4, 2017, titled "SYSTEM MAINTAINING DOMAIN-SPECIFIC 3D MODELS AS A GRAPH WITHIN COMPUTER AIDED DESIGN", naming inventors Lana Saksonov, Scott S. Harris, Elif Tosun, Paul R. Chastell, and Emmett Weeks.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2018, Onshape Inc.

BACKGROUND

Field of Technology

This disclosure relates to computer software systems for computer aided design, and more particularly to domain-specific modeling and representations within computer aided design software.

Background

Parametric cad software faces challenges handling domain-specific modeling, such as sheet metal, and providing options to produce manufacturing representations. This is due to feature ordering intrinsic to capturing design intent often conflicts with manufacturing intent (e.g. bend order examination, flat pattern optimization for nesting etc.). Existing parametric CAD solutions can produce a sheet metal representation, and generate an unfolded version of the sheet metal, but do so as operations applied to a generated model and not as a side-by-side modeling tool. Direct modeling CAD solutions handle domain-specific modeling better, including some side-by-side modeling, but do not provide a solution incorporable into parametric CAD.

Description of Prior Art

U.S. Pat. No. 7,398,129 (2008-07-08, Ishii et al., "REPRESENTATIONS OF SHEET METAL PART MODELS") discloses, in the Abstract, "Data for a 3D sheet metal part model is stored in a file. The stored data includes features of the part and manufacturing information. When different manufacturing processes are used, different geometry can be created. The file can store multiple processes for manufacturing the part and the geometry associated with each process. Thus, when manufacturing the part, the user can view information for multiple stored processes because all of the information is stored together. In addition, both 2D and 3D data is stored for the part."

United States Patent Application Pub. No. 2007/0225846 (2007-09-27, Bogan et al., "DYNAMIC TRACKING OF COMPLIANCE WITH PARAMETER LIMITS IN COMPUTER-AIDED DESIGN MODELS") discloses, in the Abstract, "A designer of a CAD model is automatically notified when parameter limits or tolerances are violated during the iterative design process. The efficiency in the design of a complex model is much improved from the automatic notification, because it enables the user to detect violations of parameter limits and tolerances as soon as they occur." This uses sensors inserted into CAD designs to monitor parameter limits.

None of the above provides a parametric CAD solution with domain-specific metadata and representation allowing simultaneous display and editing of a design view and a domain-specific manufacturing view. What is needed, therefore, is a solution that overcomes the above-mentioned limitations and that includes the features enumerated above.

BRIEF SUMMARY

For some domain-specific modeling (e.g. sheet metal, weldments, wire-harness, etc.), it is desirable to present a model to a user in multiple configurations of 3D geometry and with a summary of model objects essential for easy design and manufacturing. In the case of sheet metal model 3D geometry configurations of interest might be a flat model, a partially folded or a fully folded model. In the case of wire-harness, a 3D representation may show how the wires route through space around other structures while an alternate representation shows the bundling, connections and "cut lengths" for the same design.

Through these multiple representations, the design of an object can be observed to be consistent with manufacturing capabilities. They also allow the design intent to be abstracted from the manufacturing intent. For example the designer may model an object, creating bends in a way that is convenient for modeling. When a sheet metal part is fabricated, the bend order is very important and is determined by the manufacturing process.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

CAD—Computer Aided Design (design automation software).

Domain—A category of design where the contents and behavior of the features are specific to the function or manufacture of the objects being designed (i.e. sheet metal, weldments, wire harness, piping, tube routing, etc.).

Operation

CAD System

Domain-specific modeling with a graph representation is implemented within a software system for parametric CAD. One example preferred system is Onshape CAD, as detailed in U.S. patent application Ser. No. 15/052,418 ("Multi-User Cloud Parametric Feature-Based 3d CAD System", filed Feb. 24, 2016, naming inventors Hirschtick et al.), which is hereby fully incorporated by reference. The CAD software program may be run entirely one a single computer system, or across multiple computer systems as a distributed or cloud software solution.

A client computer device operates a display and receives user input, such as through a mouse, keyboard, or touchscreen. A user interface is rendered on the display for user control of the CAD program, either run directly from the CAD software program or run as a user interface program, such as a browser-based user interface, in communication with the CAD software program. Within the user interface, the user may manage projects for designing models, including management, creation, and editing of assemblies and parts. The CAD software program accesses storage for retaining assemblies and parts, such as file-based or through a database, and memory for managing data objects representing the assemblies and parts during display and editing through the user interface.

Within the preferred Onshape CAD software program, design models are tracked as projects having multiple tabs to access editing screens for assemblies or parts. Assembly editing is accessed through assembly tabs, and part editing through part studio tabs.

Initiating Domain-Specific Modeling

Figure 1:
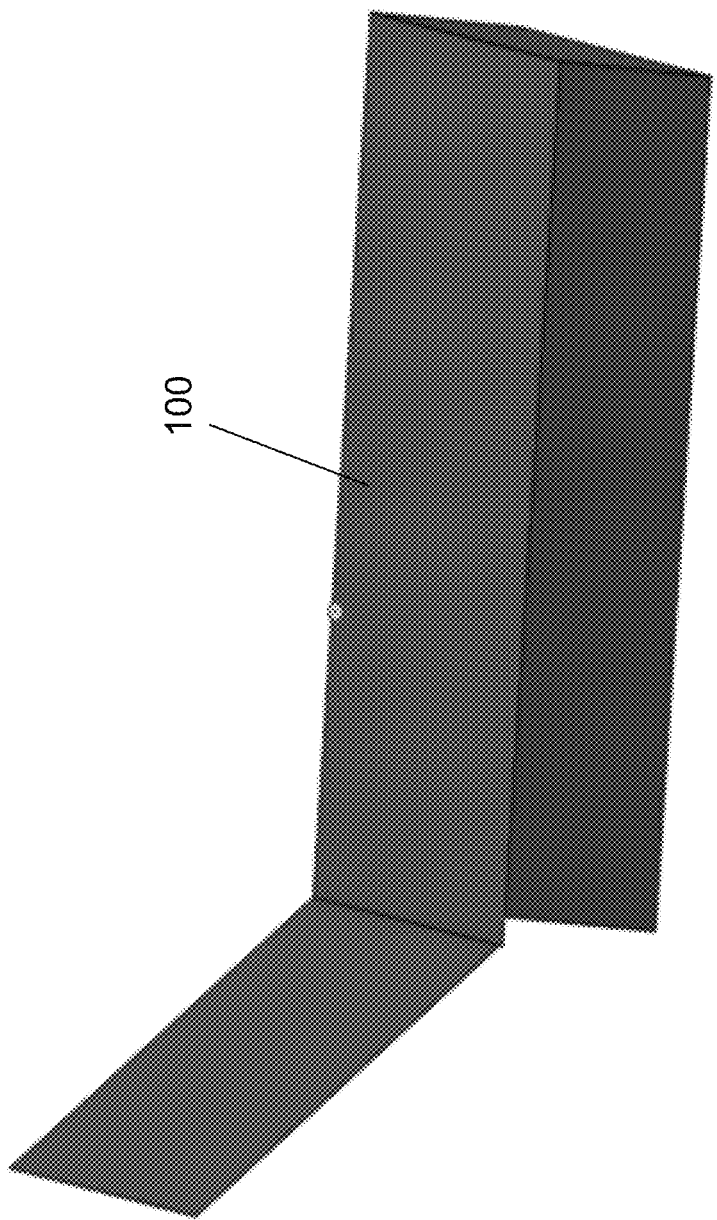
FIG. 1 illustrates a master sheet body.

Within the parametric CAD system, when editing a design which involves domain-specific manufacturing a master graph is created with user interface tools for capturing 3D model topology and geometry. For sheet metal, these are tools for building the underlying sheet body. Referring to FIG. 1, selection of geometric parts 100 within a design is used as the master sheet body.

Domain specific design begins with the user initializing the process by selecting a domain-specific tool icon in the user interface of the CAD program. In the case of sheet metal, the user selects a sheet metal tool icon to create a "Sheet Metal Model" feature. Activation of the tool icon causes the user interface to display options to input domain-specific information, which the software may track and store as metadata, necessary for construction of the geometry representations, a master graph, and fabrication of the model. In the case of sheet metal, these parameters are thickness, K-factor for calculating the neutral bending plane, the bend radius, the gap distance between edges, the corner relief type (shape of the cut-outs at the corners), and the bend relief type.

After inputting the initial metadata, the user then selects geometry from the model, as displayed within the user interface, that is used to initialize the domain-specific model.

Figure 2:
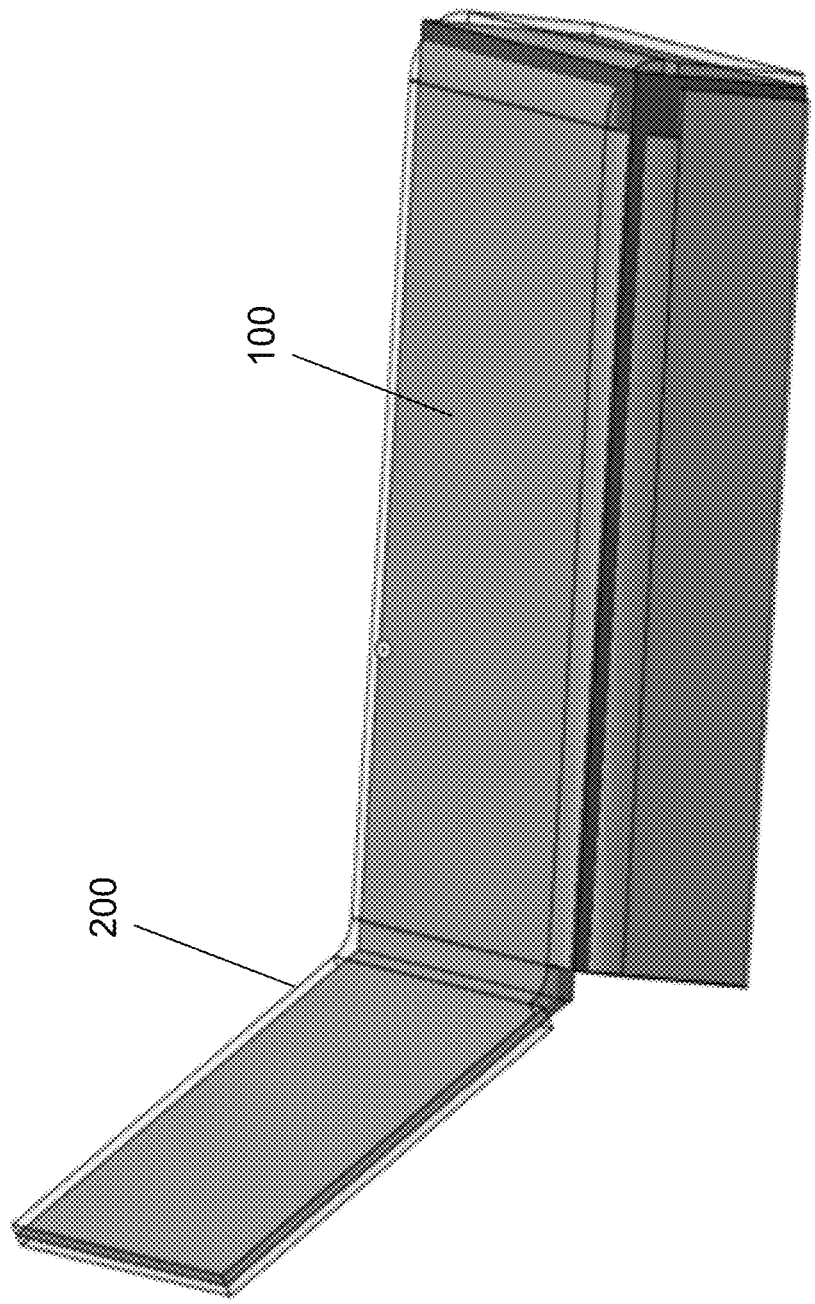
FIG. 2 illustrates a sheet metal body overlaid on the master sheet body of FIG. 1.

There may be multiple workflows for this initialization depending on the specific domain. For example, for sheet metal:

1) Prismatic parts are converted into sheet metal;
2) Curves are extruded into sheet metal; and
3) Sketch regions, surfaces, and/or faces of a part are thickened. Referring also to FIG. 2, as a result of all workflows, the "Sheet Metal Model" feature creates a sheet body 200 (shown superimposed over master sheet body 100) across all selected geometry, where the sheet body is the definition graph of the sheet metal model and corresponding metadata based on input geometry and feature parameters. This allows multiple representations of the model to be supported. These representations remain active until a "Finish Sheet Metal" feature is used, after which sheetmetal parts become subject to conventional parametric modeling.

Metadata

Object information is captured in metadata associated with elements of the master graph. Metadata is automatically generated based on geometry of master graph and user input into domain specific features. For example, a sheet metal Flange feature creates faces to represent flange wall geometry, merges them with the master sheet model and creates metadata for bends of newly created flanges, associating it with newly created two-sided edges of the master sheet body. The metadata contains domain-specific information, and may vary depending on the specific domain. For sheet metal, the metadata is a set of sheet metal objects:

i) sheet metal model, holding information of thickness, k-factor, and default bend radius
ii) sheet metal joint, which can be a rip or a bend. Bends hold bend radius information. Rips hold style information, which controls their exact 3D geometry representation.
iii) sheet metal corner, holding information on bend relief in this corner.

Master Graph

The essential geometry and topology is captured in a master graph. For example, geometric parts 100, when selected for use with a sheet metal feature tool, are used to provide the essential geometry and topology. The master graph is initialized when the domain specific model is started (e.g. a Sheet Metal user interface tool is selected) and is maintained by all the domain specific features acting on this model.

Figure 3:
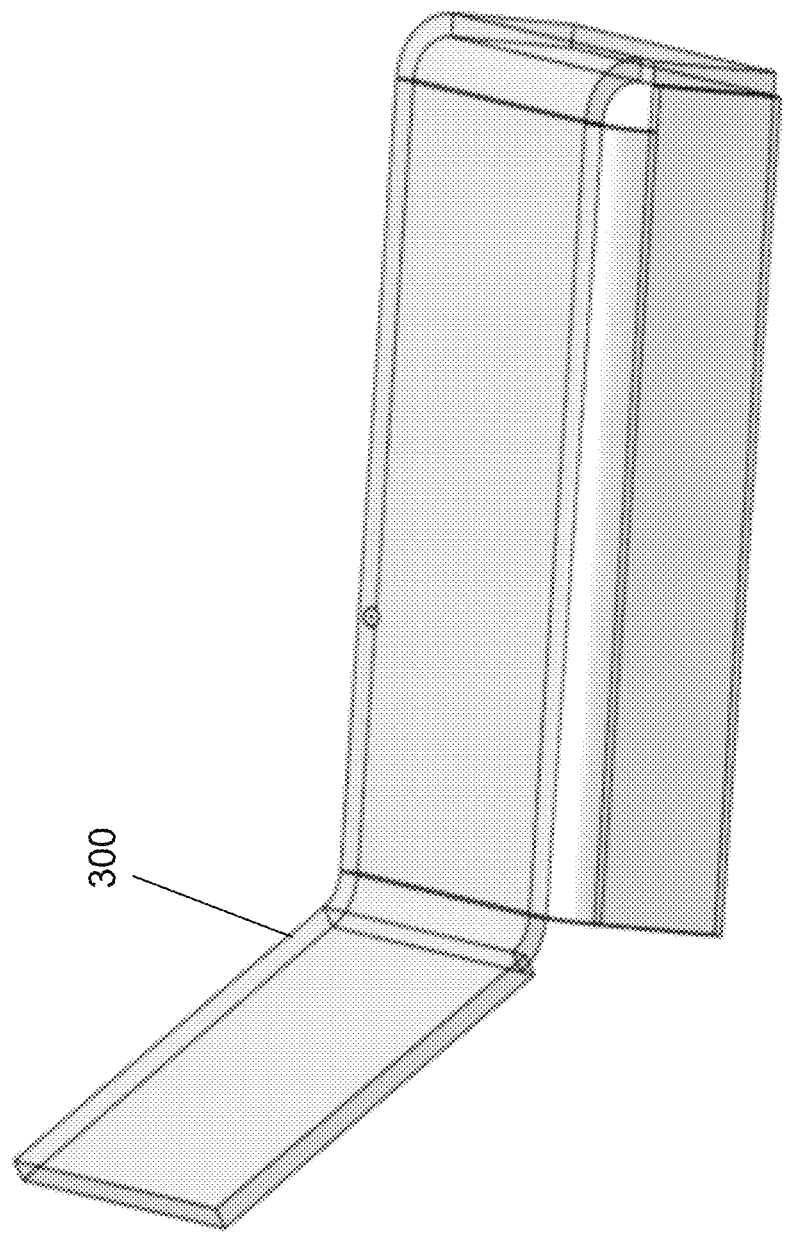
FIG. 3 illustrates the resulting sheet metal body model resulting from the sheet metal body of FIG. 2.

The master graph uses meta data collected during the creation of the domain specific feature model, and an algorithm is used to generate appropriate domain specific representations. The master graph is also used to control modifications to the model via domain specific features and behavior. In the sheet metal case, creating a Sheet Metal Model feature initializes the sheet metal master graph with appropriate information (like thickness, K-factor, bend sizes, etc.) necessary to generate the formed 3D model, the flat pattern and the table views of the model. Referring also to FIG. 3, generated sheet metal model 300 may be directly interacted with and edited by a user.

An algorithm builds multiple domain specific representations based on the master graph and metadata. The algorithms are domain-specific. For example, a sheet metal algorithm consists of following steps:

i) Wall patches are built by thickening wall faces of the master sheet model and adjusting the boundaries according to metadata for corresponding joints.
ii) Patch transformations are computed for desired fully and partially unfolded views.
iii) Corner relief tools are constructed according to metadata for corners and applied to corresponding patches.
iv) Bend patches for two representations (flattened and unflattened) are built based on metadata for bends and corners, trimmed for corner relief as necessary.
v) Transformed copies of wall patches are made for every desired fully and partially unfolded view.
vi) For every requested geometry view patches are merged together. This enables simultaneous visual representation, within the user interface, of alternate views of the model, domain-specific components (i.e. unfolded sheet metal), and metadata, with user selection or alteration of any individual representation automatically applying to and updating all representations.

Multiple Representations

Figure 4:
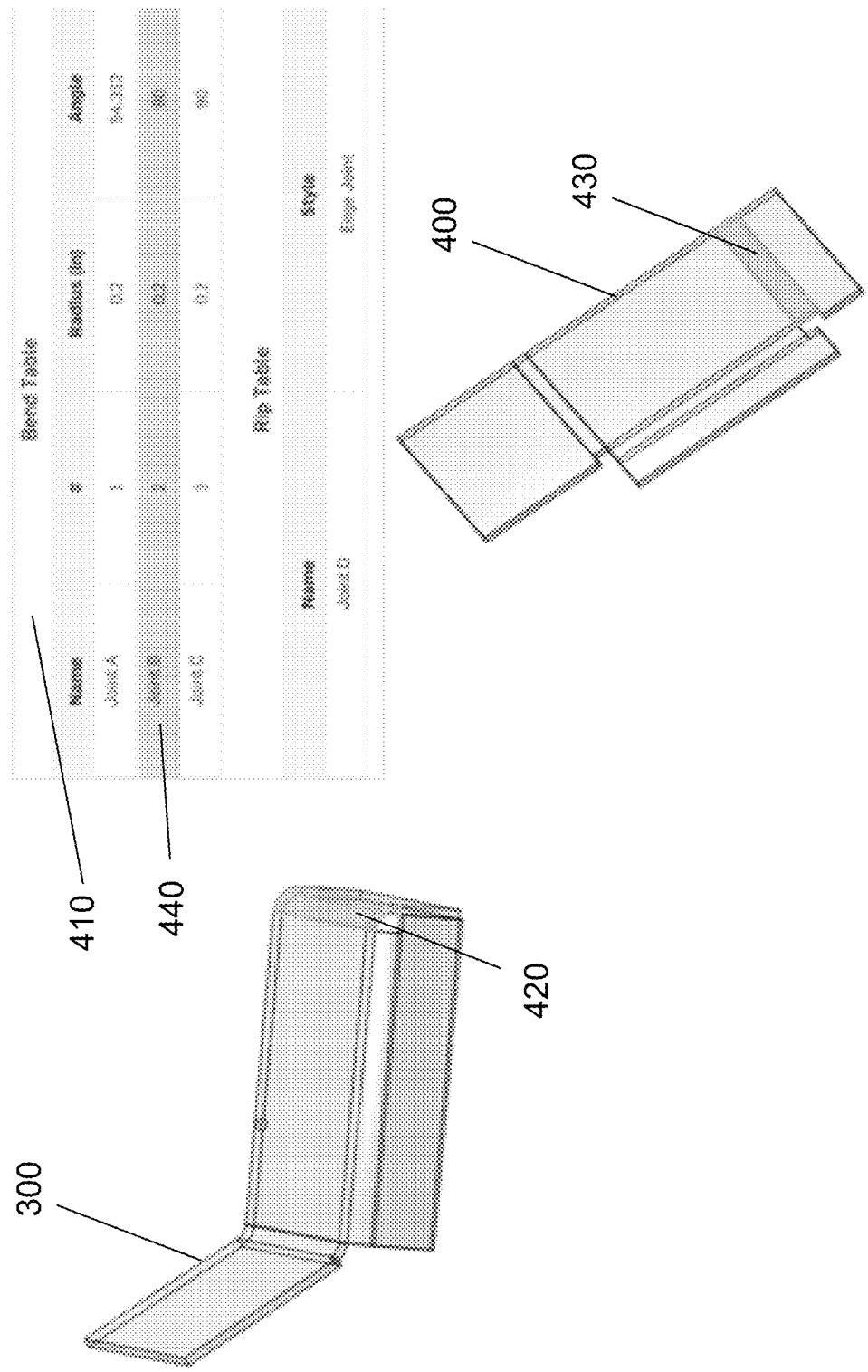
FIG. 4 illustrates a CAD user interface display allowing view and editing of a folded, unfolded, and joint summary associated representation of the sheet metal body of FIG. 3.

While the "Sheet Metal Model" tool is active, either upon initial selection or later editing a sheet metal model feature, multiple representations may be simultaneously displayed in the user interface. Referring also to FIG. 4, simultaneous multiple representations may include a 3D model, such as sheet metal body folded model 300, a domain-specific display, such as sheet metal body unfolded model 400, and domain-specific metadata, such as table 410. Selection or editing of any aspect in one representation may be simultaneously indicated and updated in all representations. For example, in the case of sheet metal, a flange feature may be selected in a 3D view as editable selection 420, a flat pattern view as editable selection 430, and within a table displaying the associated metadata as editable data entry 440. Selection in any one representation may highlight the equivalent aspect in all representations. User editing within any of the displayed multiple representations simultaneously affects and updates all views. In addition, features act upon the model in domain specific ways. For example, moving a face that is the side of a sheet metal flange causes the creation of bend relief as appropriate to sheet metal design. In the general case, while any domain specific model is active, only domain specific features cause appropriate modification until the domain specific model is "Finished." Multiple domain specific models may be created and active at the same time. The representations are managed through user interface selections which allow the user to choose which representations are visible.

After the CAD model is finalized, the CAD software may export the model in different formats for production, such as to a computer-aided manufacturing (CAM) format or directly to computer numerical control (CNC) codes for machine production of the model. With domain-specific modeling part of the design modeling process, domain-specific machining instructions may be included in the output format. Once output, machining produces the physical product designed.

Other Embodiments

The following alternate embodiments may be implemented individually, in any combination, or in any combination with the preferred embodiment previously described.

In one alternate embodiment, as a user routes wires through and around machinery, joining and splitting connections, shielding and securing various segments, the CAD software constructs an alternative view showing a simplified, two-dimensional, or schematic representation of objects being constructed. The software may flag any anomalies based on connectivity, design rules, or other constraints. The software maintains a quantitative list of materials and objects.

In another alternate embodiment, as a user manipulates and attaches structural objects, the CAD software maintains and evaluates alternate representations used for finite element analysis.

The methods and systems described herein may be implemented in hardware, software or any combination of hardware and software suitable for a particular application. The hardware may include a general purpose computer and/or dedicated computing device or specific computing device or particular aspect or component of a specific computing device, including mobile computing devices such as, but not limited to, cell phones, mobile phones, mobile personal digital assistants, laptops, palmtops, netbooks, or tablets. The processes may be realized in one or more microprocessors, micro-controllers, embedded micro-controllers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals.

The methods and systems described herein may be deployed in part or in whole through network infrastructures. The network infrastructure may include elements such as, but not limited to, computing devices, servers, routers, hubs, firewalls, clients, personal computers, communication devices, routing devices and other active and passive devices, modules and/or other components. The computing and/or non-computing device(s) associated with the network infrastructure may include, apart from other components, a storage medium such as, but not limited to, flash memory, buffer, stack, RAM, or ROM.

The computer software described herein may be stored and/or accessed on machine readable media that may include: computer components, devices, and recording media that retain digital data used for computing for some interval of time; semiconductor storage known as random access memory (RAM); mass storage typically for more permanent storage, such as, but not limited to, solid state drives, optical discs, forms of magnetic storage like hard disks, tapes, drums, cards and other types; processor registers, cache memory, volatile memory, non-volatile memory; optical storage such as CD, DVD; removable media such as flash memory, floppy disks, magnetic tape, standalone RAM disks, removable mass storage, other computer memory such as, but not limited to, dynamic memory, static memory, read/write storage, mutable storage, read only, random access, sequential access, location addressable, file addressable, content addressable, network attached storage, or a storage area network.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for direct modeling within a software system for parametric computer aided design (CAD), comprising:
   operating parametric CAD software for editing a model design;
   selecting a domain-specific feature tool for sheet metal within a user interface;
   inputting domain-specific metadata comprising inputting thickness, K-factor for calculating a neutral bending plane, a bend radius, a gap distance between edges, a corner relief type, and a bend relief type;
   selecting one or more geometric elements within the model for the specific domain;
   generating, by the parametric CAD software, a model graph based on the selected domain-specific feature tool, selected geometric elements, and input metadata;
   initializing the model graph by converting prismatic parts within the selected geometric elements into sheet metal, extruding curves within the selected geometric elements into sheet metal, and thickening sketch regions, surfaces, and faces of parts within the selected geometric elements;
   building wall patches by thickening wall faces of the model graph and adjusting boundaries according to metadata for corresponding joints;
   constructing corner relief tools according to metadata for corners and applied to corresponding patches;
   building bend patches for two flattened and unflattened representations based on metadata for bends and corners;
   identifying one or more geometry views to display;
   computing patch transformations for each of the one or more geometry views;
   transforming copies of wall patches for each of the one or more geometry views;
   merging patches together for each of the one or more geometry views;
   presenting, by the parametric CAD software, the one or more geometry views as multiple representations simultaneously for editing, including a 3D model, a domain-specific model, and a table for editing metadata, wherein edits to any representation automatically update and apply to all representations;
   selecting a feature tool to finish sheet metal modeling, and performing conventional parametric modeling on further CAD operations affecting sheetmetal parts;
   exporting, by the parametric CAD software, the model into a computer-aided manufacturing (CAM) format or computer numerical control (CNC) code; and
   machining an object from the exported model.

2. A method for direct modeling within a software system for parametric computer aided design (CAD), comprising:
   operating parametric CAD software for editing a model design;
   selecting a domain-specific feature tool sheet metal within a user interface;
   inputting domain-specific metadata comprising inputting thickness, K-factor for calculating a neutral bending plane, a bend radius, a gap distance between edges, a corner relief type, and a bend relief type;
   selecting one or more geometric elements within the model for the specific domain;
   generating, by the parametric CAD software, a model graph based on the selected domain-specific feature tool, selected geometric elements, and input metadata;
   presenting, by the parametric CAD software, multiple representations simultaneously for editing, including a 3D model, a domain-specific model, and a table for editing metadata, wherein edits to any representation automatically update and apply to all representations.

3. The method of claim 2, further comprising initializing the model graph by converting prismatic parts within the selected geometric elements into sheet metal, extruding curves within the selected geometric elements into sheet metal, and thickening sketch regions, surfaces, and faces of parts within the selected geometric elements.

4. The method of claim 3, further comprising:
   building wall patches by thickening wall faces of the model graph and adjusting boundaries according to metadata for corresponding joints;
   constructing corner relief tools according to metadata for corners and applied to corresponding patches; and
   building bend patches for two flattened and unflattened representations based on metadata for bends and corners.

5. The method of claim 4, further comprising:
   identifying one or more geometry views to display;
   computing patch transformations for each of the one or more geometry views;
   transforming copies of wall patches for each of the one or more geometry views; and
   merging patches together for each of the one or more geometry views.

6. The method of claim 5, further comprising selecting a feature tool to finish sheet metal modeling, and performing conventional parametric modeling on further CAD operations affecting sheetmetal parts.

7. A computer system for direct modeling within a software system for parametric computer aided design (CAD), the computer system including a computer processor operating software stored on a non-transient computer readable media, the software including instructions to:
   edit a design model within a parametric CAD environment;
   receive user selection of a domain-specific feature tool for sheet metal within a user interface;
   receive user input of domain-specific metadata comprising inputting thickness, K-factor for calculating a neutral bending plane, a bend radius, a gap distance between edges, a corner relief type, and a bend relief type;
   receive user selection of one or more geometric elements within the model for the specific domain;
   generate a model graph based on the selected domain-specific feature tool, selected geometric elements, and input metadata;
   initialize the model graph by converting prismatic parts within the selected geometric elements into sheet metal, extruding curves within the selected geometric elements into sheet metal, and thickening sketch regions, surfaces, and faces of parts within the selected geometric elements;
   build wall patches by thickening wall faces of the model graph and adjusting boundaries according to metadata for corresponding joints;
   construct corner relief tools according to metadata for corners and applied to corresponding patches;
   build bend patches for two flattened and unflattened representations based on metadata for bends and corners;
   identify one or more geometry views to display;
   compute patch transformations for each of the one or more geometry views;

transform copies of wall patches for each of the one or more geometry views;

merge patches together for each of the one or more geometry views;

present the one or more geometry views as multiple representations simultaneously for editing, including a 3D model, a domain-specific model, and a table for editing metadata, wherein edits to any representation automatically update and apply to all representations;

receive user selection of a feature tool to finish sheet metal modeling, and perform conventional parametric modeling on further CAD operations affecting sheetmetal parts;

export, by the parametric CAD software, the model into a computer-aided manufacturing (CAM) format or computer numerical control (CNC) code for machining an object from the exported model.

8. A computer system for direct modeling within a software system for parametric computer aided design (CAD), the computer system including a computer processor operating software stored on a non-transient computer readable media, the software including instructions to:

edit a design model within a parametric CAD environment;

receive user selection of a domain-specific feature tool for sheet metal within a user interface;

receive user input of domain-specific metadata comprising input of thickness, K-factor for calculating a neutral bending plane, a bend radius, a gap distance between edges, a corner relief type, and a bend relief type;

receive user selection of one or more geometric elements within the model for the specific domain;

generate a model graph based on the selected domain-specific feature tool, selected geometric elements, and input metadata;

present multiple representations simultaneously for editing, including a 3D model, a domain-specific model, and a table for editing metadata, wherein edits to any representation automatically update and apply to all representations.

9. The computer system of claim 8, wherein the software further includes instructions to initialize the model graph by converting prismatic parts within the selected geometric elements into sheet metal, extruding curves within the selected geometric elements into sheet metal, and thickening sketch regions, surfaces, and faces of parts within the selected geometric elements.

10. The computer system of claim 9, wherein the software further includes instructions to:

build wall patches by thickening wall faces of the model graph and adjusting boundaries according to metadata for corresponding joints;

construct corner relief tools according to metadata for corners and applied to corresponding patches; and build bend patches for two flattened and unflattened representations based on metadata for bends and corners.

11. The computer system of claim 10, wherein the software further includes instructions to:

identify one or more geometry views to display;

compute patch transformations for each of the one or more geometry views;

transform copies of wall patches for each of the one or more geometry views; and merge patches together for each of the one or more geometry views.

12. The computer system of claim 11, wherein the software further includes instructions to receive selection a feature tool to finish sheet metal modeling, and perform conventional parametric modeling on further CAD operations affecting sheetmetal parts.

* * * * *